(12) United States Patent
Nininger

(10) Patent No.: US 9,936,624 B2
(45) Date of Patent: Apr. 10, 2018

(54) LIFT ASSIST SYSTEM FOR AGRICULTURAL TOOLS

(71) Applicant: KUHN KRAUSE, INC., Hutchinson, KS (US)

(72) Inventor: Jesse Nininger, Hutchinson, KS (US)

(73) Assignee: KUHN KRAUSE, INC., Hutchinson, KS (US)

( * ) Notice: Subject to any disclaimer, the term of this patent is extended or adjusted under 35 U.S.C. 154(b) by 37 days.

(21) Appl. No.: 15/259,819

(22) Filed: Sep. 8, 2016

(65) Prior Publication Data

US 2018/0064022 A1    Mar. 8, 2018

(51) Int. Cl.
*A01B 63/14* (2006.01)
*A01B 59/043* (2006.01)

(52) U.S. Cl.
CPC ............ *A01B 63/14* (2013.01); *A01B 59/043* (2013.01)

(58) Field of Classification Search
CPC ..... A01B 59/043; A01B 63/00; A01B 63/002; A01B 63/02; A01B 63/08; A01B 63/11; A01B 63/14; A01B 63/145; A01B 63/16
See application file for complete search history.

(56) References Cited

U.S. PATENT DOCUMENTS

| | | | | |
|---|---|---|---|---|
| 3,174,557 A * | 3/1965 | Newkirk | ................. | A01B 63/16 172/319 |
| 3,207,233 A * | 9/1965 | Shumaker | ............ | A01B 51/026 172/316 |
| 3,542,135 A * | 11/1970 | McCanse | ............. | A01B 63/026 172/319 |
| 3,559,746 A * | 2/1971 | Couser | ................... | A01B 51/04 172/386 |
| 3,672,701 A * | 6/1972 | Blank | ..................... | A01B 21/08 172/327 |
| 3,870,107 A * | 3/1975 | Orthman | ................ | A01B 63/22 172/260.5 |
| 4,236,587 A * | 12/1980 | Shader | .................. | E02F 3/7663 172/451 |
| 4,817,730 A * | 4/1989 | Winter | ................. | A01B 63/145 172/328 |
| 4,903,781 A * | 2/1990 | Smit | .................... | A01B 63/145 172/316 |
| 5,228,522 A * | 7/1993 | Stufflebeam | ........... | A01B 63/11 172/413 |

(Continued)

FOREIGN PATENT DOCUMENTS

DE    10224861 A1 * 12/2003 ............. A01B 63/11
FR    2034125 A7 * 12/1970 ........... A01B 49/065

*Primary Examiner* — Matthew D. Troutman
(74) *Attorney, Agent, or Firm* — Oblon, McClelland, Maier & Neustadt, L.L.P.

(57) ABSTRACT

A lift assist system to assist an tool including a toolbar; a pair of casters affixed to the articulated arms to provide support on a ground surface; and articulated arms constructed to be articulated from a work position, wherein the tool is in contact with the ground surface to a transport position wherein the tool is not in contact with the ground surface. The articulated arms includes a limiter rotatably affixed to the support bars, and an adjuster that connects the limiter, wherein the limiter regulates the articulated arms and maintains the gauge wheel pivot axis in a near vertical position, and the adjuster maintains a precise positioning relationship of the articulated arms.

20 Claims, 6 Drawing Sheets

(56) References Cited

U.S. PATENT DOCUMENTS

| | | | | |
|---|---|---|---|---|
| 5,289,880 A | * | 3/1994 | Barto | E02F 3/7663 |
| | | | | 172/319 |
| 6,032,746 A | * | 3/2000 | Lowery | E02F 3/844 |
| | | | | 172/445.1 |
| 6,378,619 B2 | * | 4/2002 | Mayerle | A01B 63/11 |
| | | | | 172/2 |
| 7,025,008 B2 | * | 4/2006 | Fischer | A01B 59/043 |
| | | | | 111/52 |
| 2004/0216654 A1 | * | 11/2004 | Fischer | A01B 59/043 |
| | | | | 111/52 |

* cited by examiner

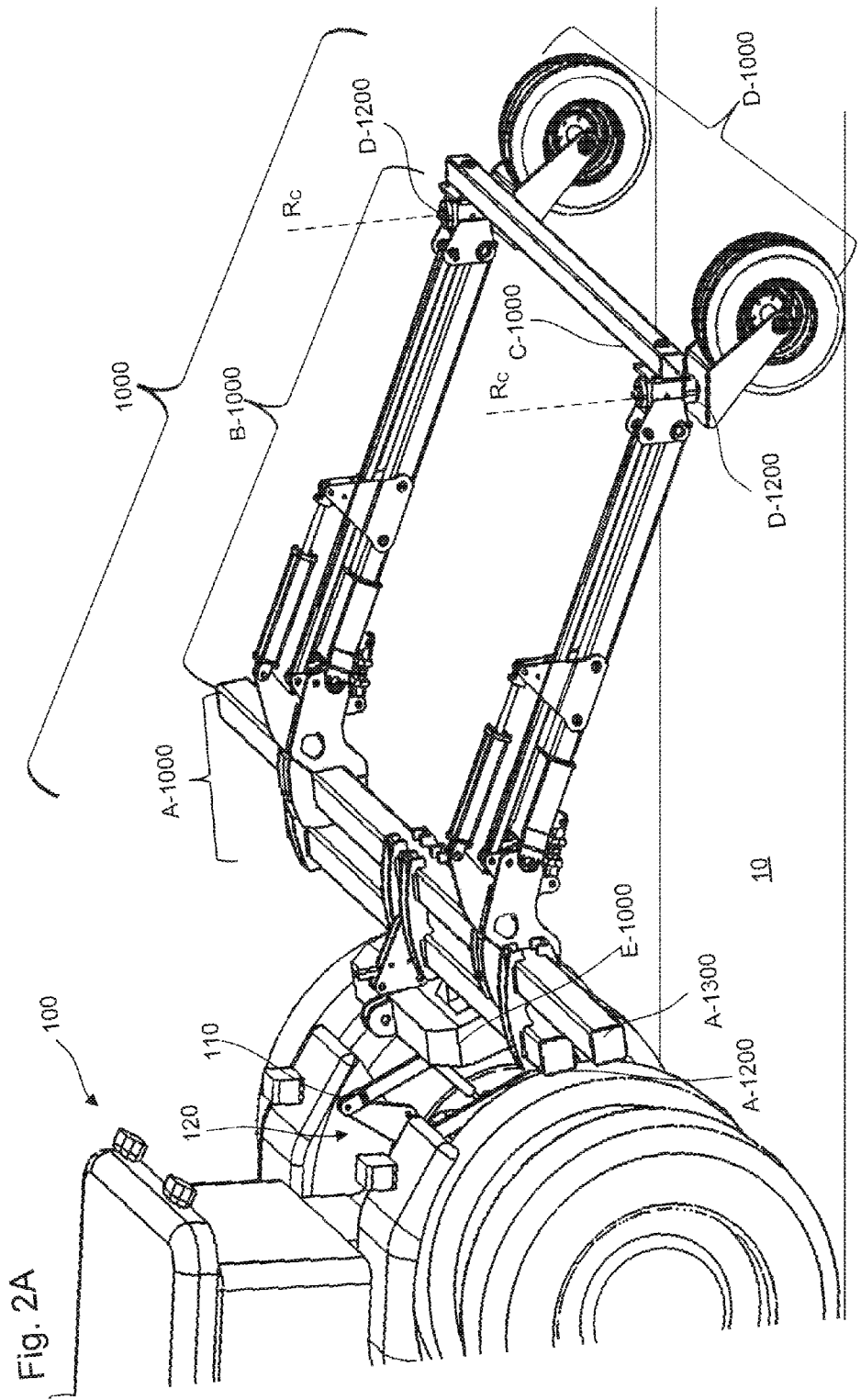

LIFT ASSIST SYSTEM FOR AGRICULTURAL TOOLS

BACKGROUND

Field of the Disclosure

The present disclosure relates to agricultural equipment tools. More precisely, the present application relates to lift assist system for supporting and lifting agricultural tools such as fertilizer and spreader tools, tillage tools, hay, and forage tools.

Description of the Related Art

In today's agriculture, optimizing agricultural tasks and operations is essential for profit realization. Such a demand for optimization and efficiency can be addressed with the ability to work on large areas of land and the ability to minimize the number of passes across a ground surface as much as possible.

To this end, large scale agricultural tools having wide working widths that can plow, till, plant, feed, weed, or harvest have been adopted. These large scale agricultural tools can cover large areas of the ground surface in a single pass effectively reducing the number of trips across the ground surface.

However, the size of these large scale agricultural tools generates an increase in weight as well as an increase of transport and maneuverability issues. This is a particular problem as most of these large agricultural tools are pulled, carried, and transported by tractors. For example, when one of these large tools are lifted for field turns or transport, the full weight of the large tool is transferred to the rear wheels of the tractor. This can cause the tractor to become overloaded, increase tractor tire wear and can create instability with associated safety issues, or even leads to the incapability to raise the large tool.

In order to address the problem of lifting and carrying these large agricultural tools, conventional lift assist systems relying on articulated arms extending between a toolbar and gauge wheels are often used to provide additional lift capacity for the large agricultural tool.

In such conventional lift assist systems when the toolbar is lifted or lowered, the gauge wheels have to fully and freely swivel around pivots to facilitate maneuverability of the large tool by the tractor.

Although such conventional lift assist systems are widely used, they present important drawbacks. Notably, in such conventional lift assist systems when the large agricultural tool is lifted or lowered, the pivots of the gauge wheels are tilted from a vertical alignment due to the tractor hitch articulation that tilts the toolbar. Such a misalignment from the vertical position prevents the gauge wheel from working efficiently to follow the tractor and may damage the gauge wheel and/or associated components.

For example, for a conventional lift assist system X-100 relying on gauge wheels X-120 supported by caster wheel X-110 that rotates around a caster axis Rc, in the transport position the pivots X-120 are no longer aligned with a vertical N, as illustrated in FIG. 1. Consequently, the gauge wheels X-120 may not be able to fully and freely rotate around the caster axis Rc which can increase the load on the gauge wheels and may impede maneuverability.

Some conventional lift assist systems may adjust the articulated arms to allow the pivot to be substantially aligned with the vertical when the large scale agricultural tool is either in a transport position, i.e., lifted for field turns and maneuvers, or in a work position, i.e., lowered to perform work on the field, but not both.

Thus, a lift assist system that allows the gauge wheels to function efficiently in both the transport and work positions is needed

SUMMARY

Accordingly, the object of the present disclosure is to provide a lift assist system which overcomes the above-mentioned limitations of a non-vertical alignment of the gauge wheel pivots when utilizing the lift assist system.

The lift assist system of the present disclosure maintains a substantial vertical alignment for the gauge wheel pivots by compensating for the tilting of the toolbar. Thus, the lift assist system can maintain the gauge wheel pivots substantially aligned with the vertical to have the gauge wheels perform optimally.

In one non-limiting illustrative example, a lift assist system is presented. The lift assist system includes; a toolbar; articulated arms; a castering gauge wheel affixed to the articulated arms to provide support on a ground surface; and the pair of articulated arms constructed to articulate, via an operation of the lift mechanism, from a work position wherein the tool is in contact with the ground surface to a transport position wherein the tool is not in contact with the ground surface, each articulated arm of the pair of articulated arms including a first mount affixed to the toolbar, a second mount affixed to the gauge wheel, a support beam having a first end rotatably affixed to the first mount, and a second end rotatably affixed to the second mount, a linkage beam having a first end rotatably affixed to the first mount via bell cranks pivotally affixed to the first end of the linkage beam, and a second end rotatably affixed to the second mount, and an adjuster that connects the first end of the support beam to the bell crank, wherein the bell cranks compensate for the toolbar tilting amplitude, and the adjuster provides precision adjustment of vertical pivot axis of the castering gauge wheel.

In another non-limiting illustrative example, a lift assist system is presented. The lift assist system includes a toolbar; a pair of articulated arms; a castering gauge wheel affixed to the pair of articulated arms to provide support on a ground surface; and the pair of articulated arms being constructed to be articulated, via an operation of the lift mechanism, from a work position wherein the tool is in contact with the ground surface to a transport position wherein the tool is not in contact with the ground surface, each articulated arm of the pair of articulated arms including a first mount affixed to the toolbar, a second mount affixed to the castering gauge wheel, a support beam having a first end rotatably affixed to the first mount, and a second end rotatably affixed to the second mount, a linkage beam having a first end rotatably affixed to the first mount via bell cranks, and a second end rotatably affixed to the second mount, a C-shaped anchor affixed to the first mount, a triangular bracket affixed to the support beam, and an actuator that connects the C-shaped anchor and the triangular bracket to generate a down bias force on the support beam, and an adjuster that connects the first end of the support beam to adjust the near vertical amplitude.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2A is a perspective view of a lift assist system attached to a tractor, according to certain aspects of the disclosure;

DETAILED DESCRIPTION

Figure 1:
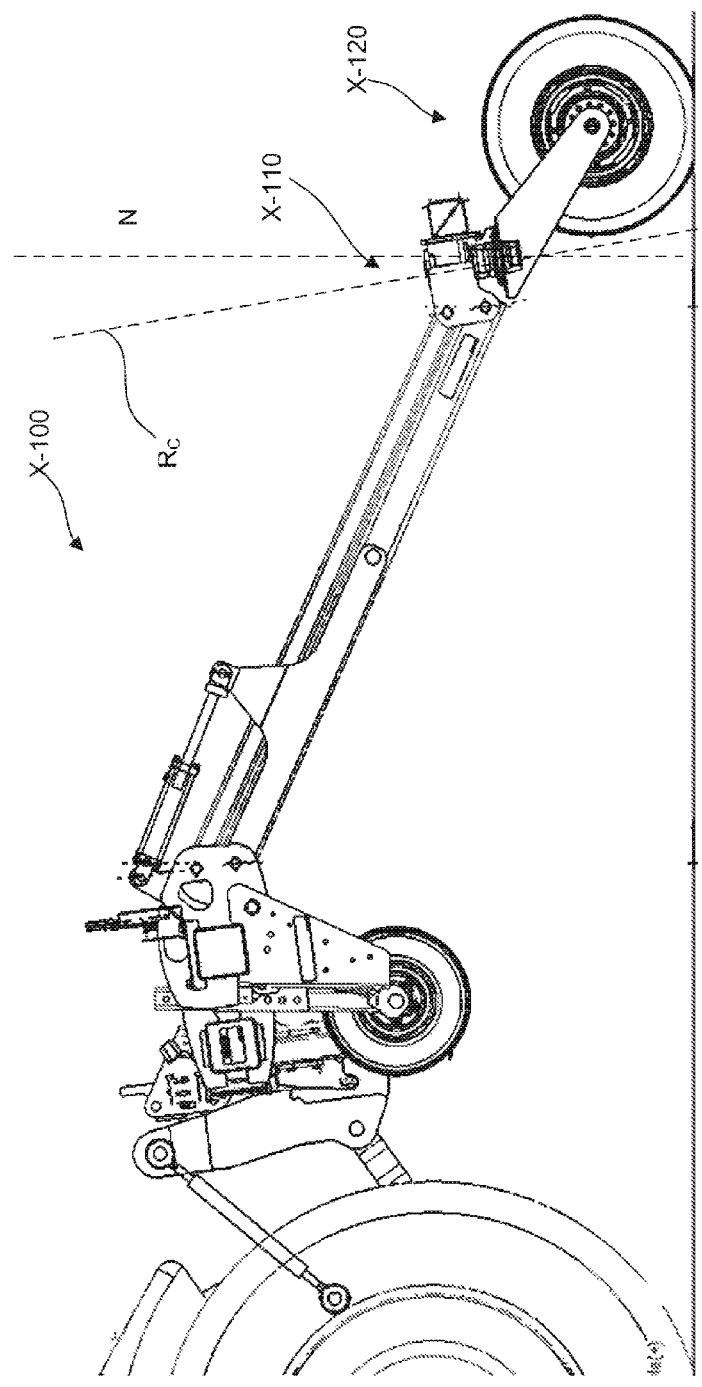
FIG. 1 is a side view of a conventional lift assist system.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

Figure 2B:
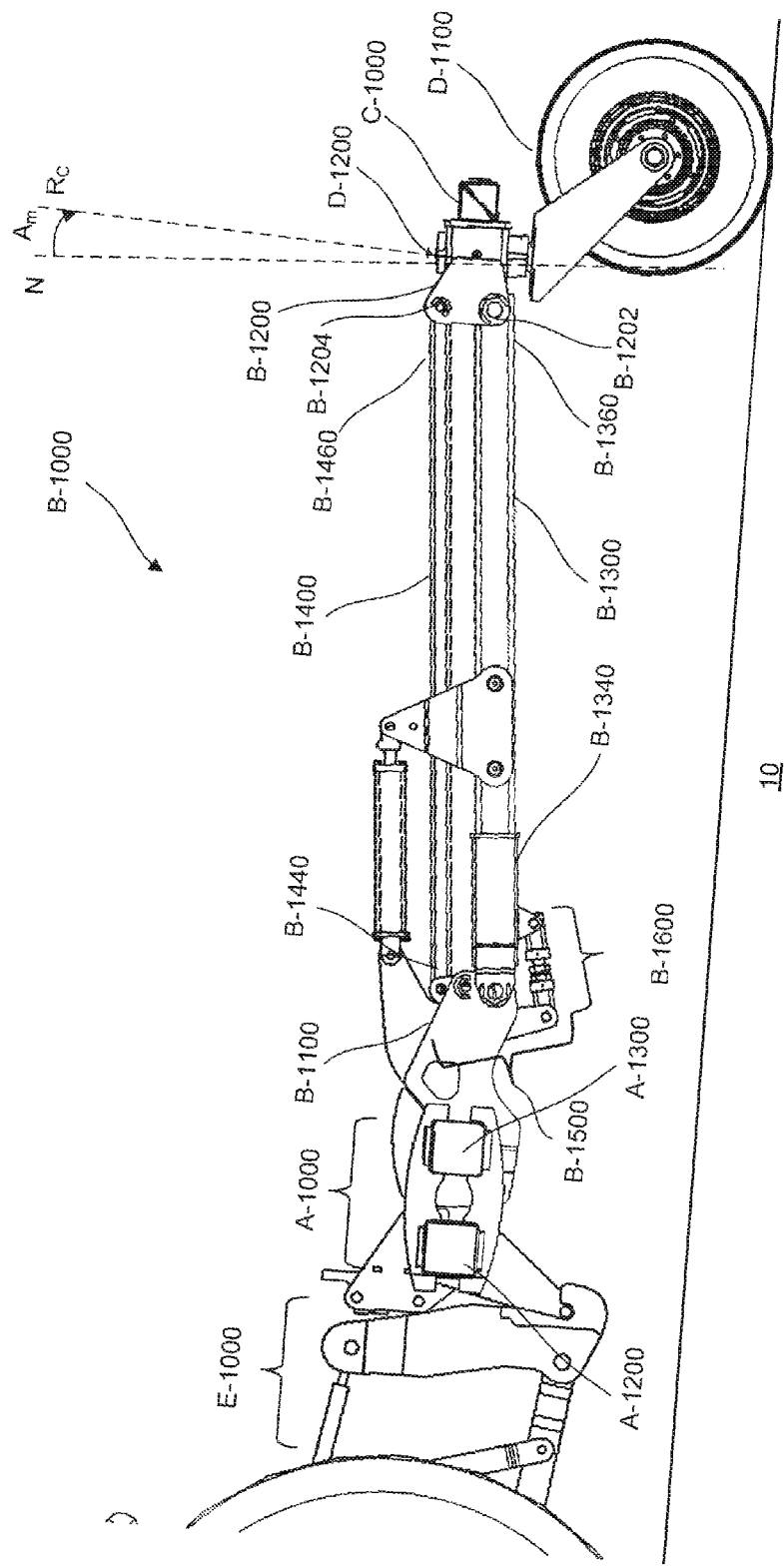
FIG. 2B is a side view of the lift assist system in a work position, according to certain aspects of the disclosure.
Figure 2C:
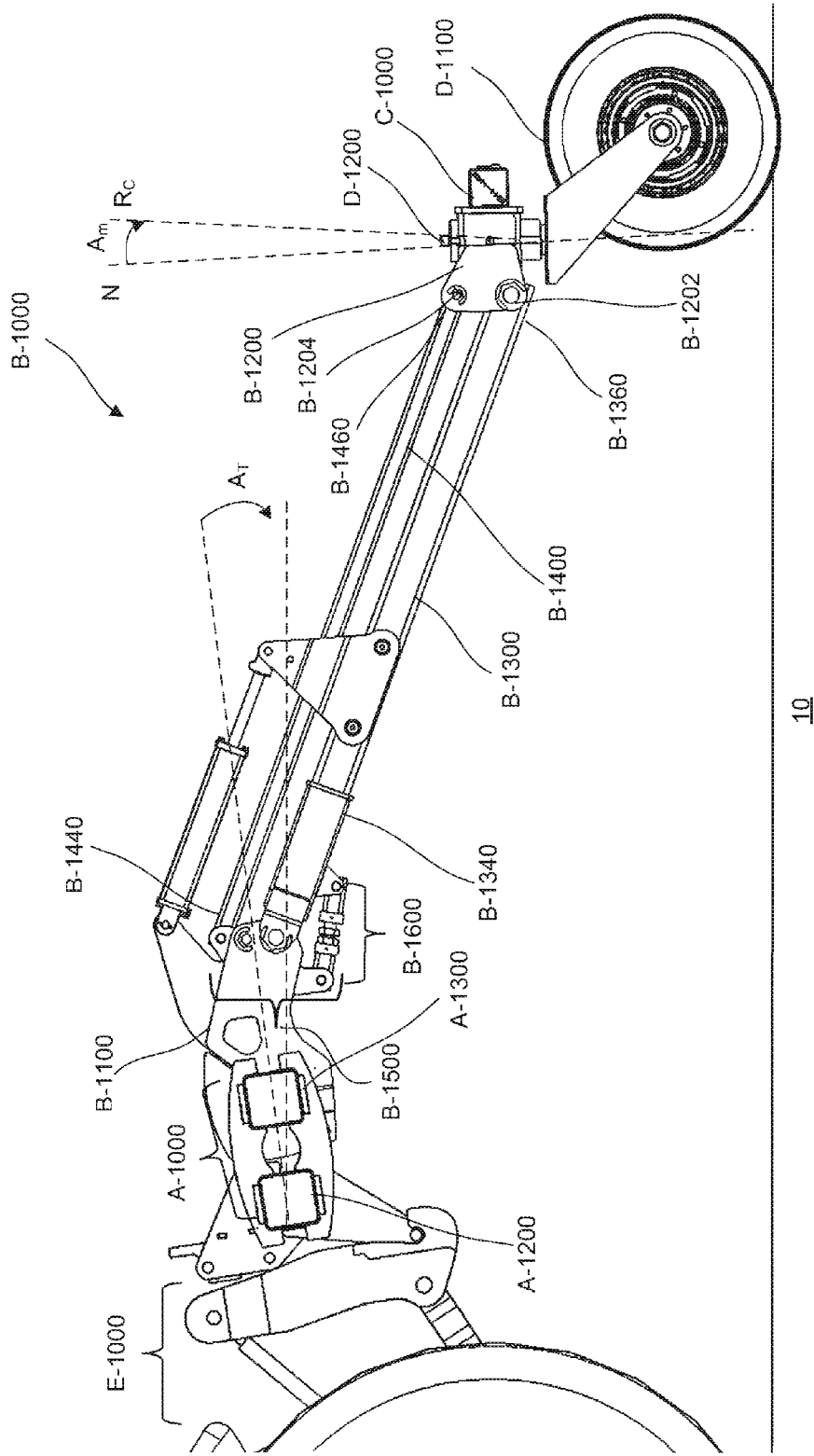
FIG. 2C is a side view of the lift assist system in a transport position, according to certain aspects of the disclosure.

FIGS. 2A-2C are a perspective view of a lift assist system 1000 attached to a tractor 100, a side view of the lift assist system 1000 in a work position, and a side view of the lift assist system 1000 in a transport position, respectively, and according to certain aspects of the disclosure.

The lift assist system 1000 can be attached behind the tractor 100 via a three-point hitch 110 and to support a tool, e.g., a plow, a tiller, and/or a fertilizer, via a toolbar A-1000, and to be pulled by the tractor 100 on a ground surface 10, e.g., a field to plow, to till, and/or fertilize, via a pair of gauge wheels D-1000. Each gauge wheel of the pair of gauge wheels D-1000 can include a caster pivot D-1200 that allows the gauge wheel D-1000 to rotate around a caster axis $R_C$.

A lift mechanism 120 of the tractor 100 can actuate the three-point hitch 110 in order to articulate the toolbar A-1000 and the lift assist system 1000 from a work position to a transport position, and vice-versa.

In the work position, the toolbar A-1000 is sufficiently close to the ground surface 10 for the tool to be in contact with the ground surface 10 and to perform work on the ground surface 10, as illustrated in FIG. 2B. In the transport position, the toolbar A-1000 is sufficiently high above the ground surface 10 to avoid contact between the tool and the ground surface 10 and to transport the tool by the tractor 100, as illustrated in FIG. 2C.

The lift assist system 1000 maintains the caster pivot D-1200 and the caster axis $R_C$ of the gauge wheel D-1000 substantially aligned with a vertical plane N. The alignment of the caster pivot D-1200 and the caster axis $R_C$ with the vertical plane N allows the gauge wheel D-1000 to work efficiently by being able to freely and fully rotate around the caster pivot D-1200.

A misalignment of the caster axis $R_C$ with the vertical plane N can generate a non-uniform load on the caster pivot D-1200 as the gauge wheel D-1000 fully rotates around the caster axis $R_C$, which in return can impede the maneuverability of the lift assist system 1000.

As used herein, the term "front" refers to the region of the lift assist system 1000 closest to the tractor 100, the term "rear" refers to the region of the lift assist system 1000 closest to the pair of gauge wheels D-1000, the term "low" refers to the region of the lift assist system 1000 closest to the ground surface 10, and the term "high" refers to the regions of the lift assist system 1000 farthest from the ground surface 10.

The lift assist system 1000 can include a three-point hitch linkage E-1000 to be affixed to the three-point hitch 110 of the tractor 100, the toolbar A-1000 affixed to the three-point hitch linkage E-1000, a wheel bar C-1000 supported by the pair of gauge wheels D-1000, and a pair of articulated arms B-1000 extended between the toolbar A-1000 and the wheel bar C-1000.

The toolbar A-1000 can be any support structure capable of supporting the tool. For example, the toolbar A-1000 can be a front beam A-1200 and a back beam A-1300 placed substantially adjacent and parallel from each other, as illustrated in FIG. 2C. In another example, the toolbar A-1000 can be a foldable single beam that can be articulated to extend the length of the toolbar A-1000.

In the work position, the toolbar A-1000 is substantially perpendicular with the vertical plane N, while in the transport position the toolbar A-1000 is tilted from the vertical plane N at a toolbar tilt angle $A_T$.

The tilting of the toolbar A-1000 may be due to a curvilinear articulation of the three-point hitch linkage E-1000 that rotates the toolbar A-1000 by the toolbar tilt angle $A_T$. The toolbar tilt angle $A_T$ can depend on articulations parameters of the three-point hitch 110 such as an articulation angle, range of motion, or the like.

The pair of articulated arms B-1000 extends between the toolbar A-1000 and the wheel bar C-1000 between distal ends of the toolbar A-1000 and distal ends of the wheel bar C-1000. The wheel bar C-1000, the pair of articulated arms B-1000, and the toolbar A-1000 are supported on a front part by the three-point hitch linkage E-1000 and supported on a back part by the pair gauge wheels D-1000.

Figure 3:
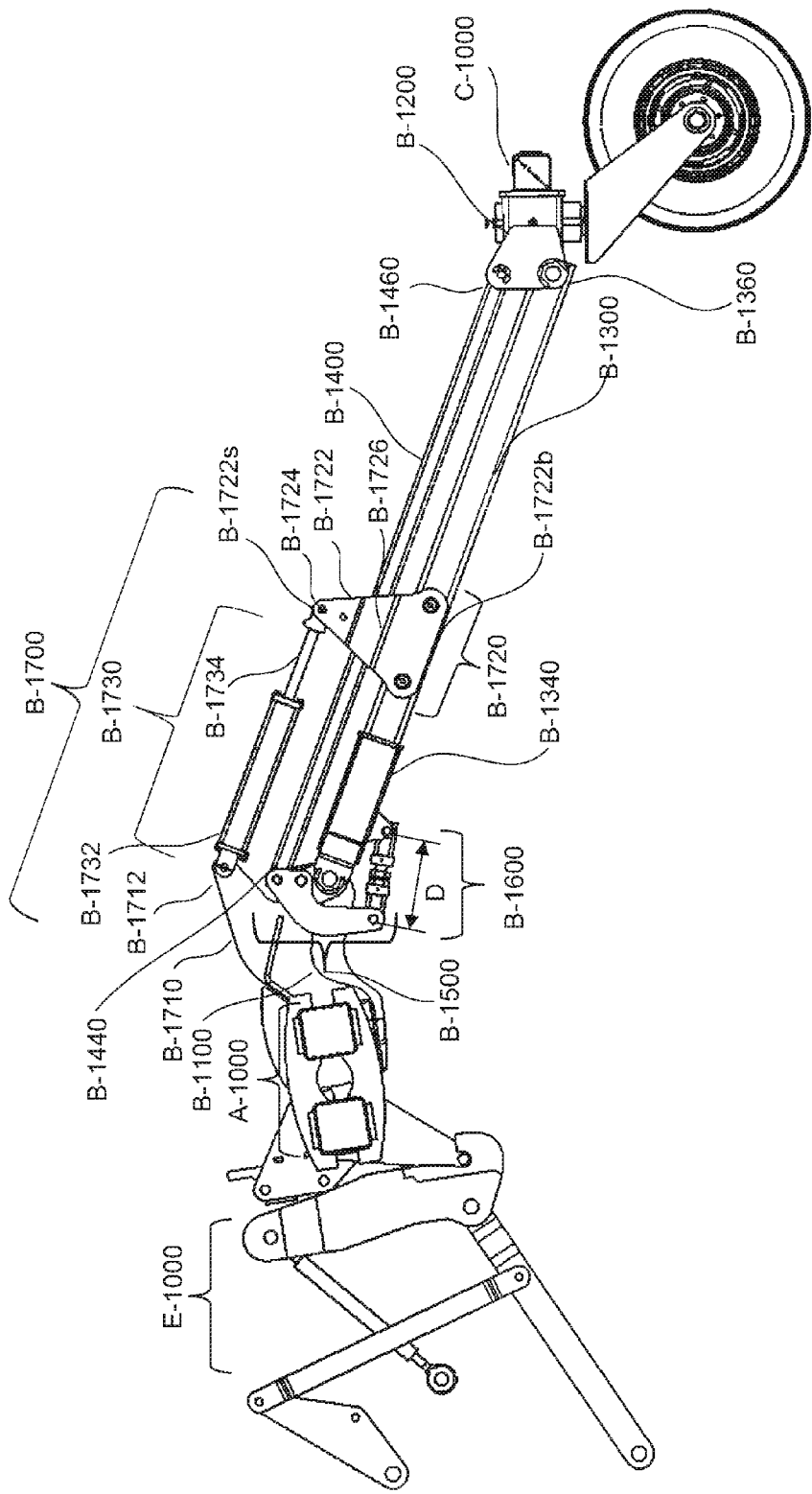
FIG. 3 is a side view of the lift assist system detached from the tractor, according to certain aspects of the disclosure.

FIG. 3 is a side view of the lift assist system 1000 detached from the tractor 100, according to certain aspects of the disclosure.

Each articulated arm of the pair of articulated arms B-1000 can include a front mount B-1100 affixed to the toolbar A-1000, a back mount B-1200 connected to the wheel bar C-1000, a support beam B-1300 having a front end B-1340 rotatably connected to the front mount B-1100 and a back end B-1360 rotatably connected to the back mount B-1200, a linkage beam B-1400 placed above the support beam B-1300 having a front end B-1440 connected to the front mount B-1100 via a linkage B-1500 including bell cranks B-1510s and a back end B-1460 rotatably connected to the back mount B-1200.

The support beam B-1300 can provide support between the front mount B-1100 and the back mount B-1200.

The front end B-1440 of the linkage beam B-1400 can be connected to the front mount B-1100 via a linkage B-1500 and the support beam B-1300 can be connected to the front mount B-1100 via an adjuster B-1600 placed between the linkage B-1500 and the support beam B-1300.

The linkage B-1500 provide a connection between the linkage beam B-1400 and the support beam B-1300 that maintains the caster pivot D-1200 and the caster axis $R_C$ substantially aligned with the vertical plane N.

The adjuster B-1600 allows calibrating of an alignment of the caster axis $R_C$ with the vertical plane N when the lift assist system 1000 is in the transport position. The calibration of the alignment of the caster axis $R_C$ with the vertical plane N may depend on the toolbar tilt angle $A_T$ that can have different values depending on the type or model of the three-point hitch 110 and or the type or model of tool used.

Each articulated arm of the pair of articulated arms B-1000 can include an assistance system B-1700 to assist the tractor 100 in the articulation of the tool from the work position to the transport position.

The assistance system B-1700 can include a C-shaped anchor B-1710 affixed to the front mount B-1100 that protrudes upwardly and backwardly above the linkage beam B-1400, a triangular bracket B-1720 affixed to the support beam B-1300 that protrudes upwardly above the linkage beam B-1400, and an actuator B-1730 rotatably affixed to a backward extremity B-1712 of the C-shaped anchor B-1710 and rotatably affixed to the triangular bracket B-1720.

The actuator B-1730 can generate a bias force between the front mount B-1100 and the back mount B-1200, through the support beam B-1300, thereby applying a lifting force to assist the lift mechanism 110 of the tractor 100 in articulating the lift assist system 1000 from the work position to the transport position. The actuator B-1730 can be mechanical, hydraulic, electrical, or pneumatic. For example, the actuator B-1730 may include a cylinder B-1732 containing pressurized fluid, e.g., air, carbon dioxide, or oil, that actuates a piston B-1734 rotatably connected to the triangular bracket B-1720.

Figure 4:
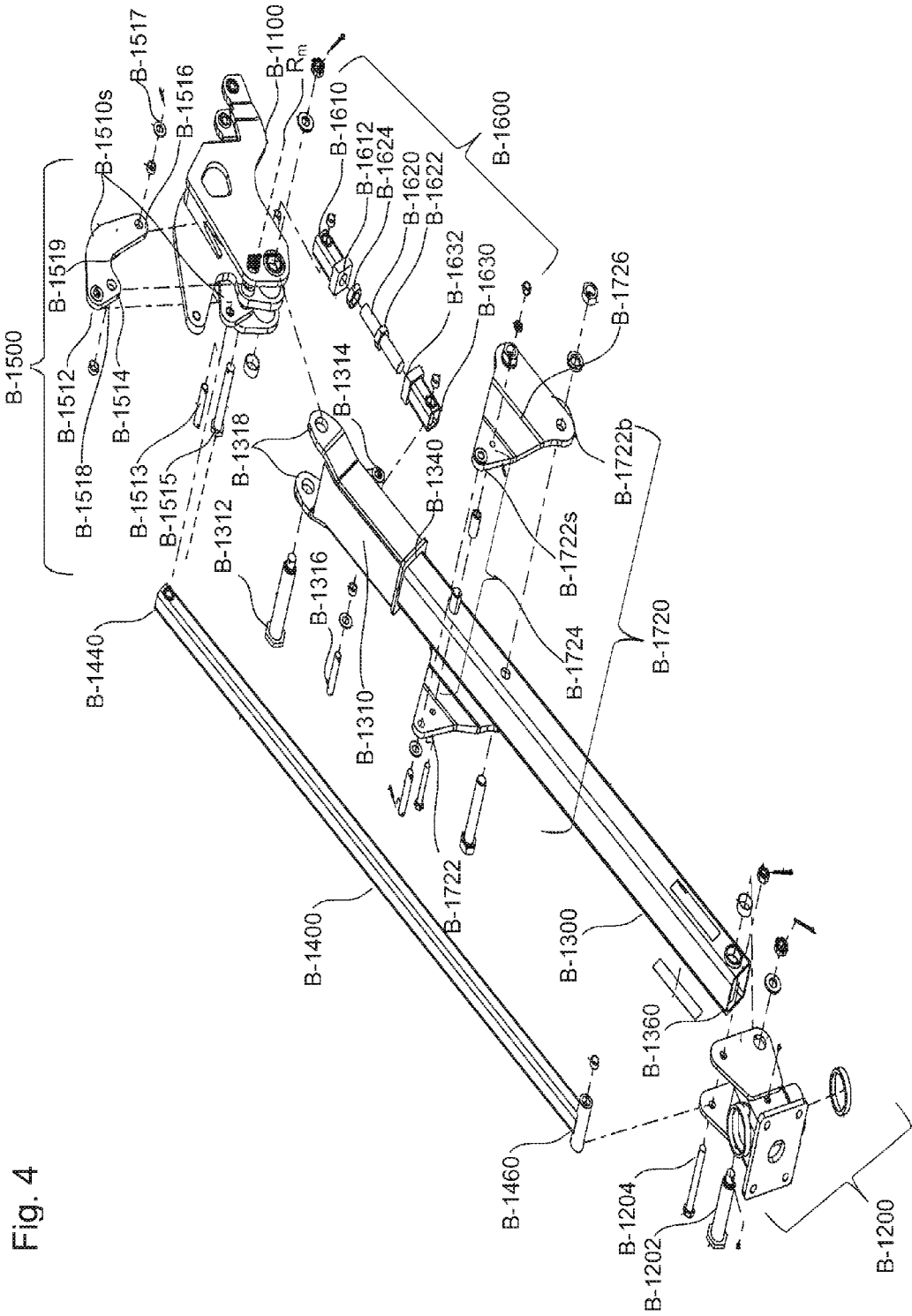
FIG. 4 is an exploded view of an articulated arm of the lift assist system, according to certain aspects of the disclosure.

FIG. 4 is an exploded view of the articulated arm B-1000 of the lift assist system 1000, according to certain aspects of the disclosure.

The link B-1500 can include bell cranks B-1510s inserted in the front mount B-1100. The bell cranks B-1510s can include an upper extremity B-1512 that protrudes upwardly from the front mount B-1100, a lower extremity B-1516 that protrudes downwardly from the front mount B-1100, and a middle extremity B-1514 between the upper extremity B-1512 and the lower extremity B-1516. The upper extremity B-1512 can include an bell crank upper pivot B-1513, e.g., shafts, bearings, pins, shoulders, nuts and bolts, or the like, that rotatably connects the bell cranks B-1510s to the front end B-1440 of the linkage beam B-1400, the middle extremity B-1514 can include a bell crank middle pivot B-1515, e.g., shafts, bearings, pins, shoulders, nuts and bolts, or the like, that pivotally connects the bell cranks B-1510s to the front mount B-1100, and the lower extremity B-1516 can include a bell crank lower pivot B-1517, e.g., shafts, bearings, pins, shoulders, nuts and bolts, or the like, that rotatably connects the bell cranks B-1510s to the adjuster B-1600.

The bell crank middle pivot B-1515 enables a rotation of the bell cranks B-1510s around a middle axis of rotation $R_m$ substantially parallel to the wheel bar C-1000 and placed on both sides of the front end B-1440 of the linkage beam B-1400.

In addition, the bell cranks B-1510s can be a pair of plates, wherein each plate has a flat side B-1518 that joins the upper extremity B-1512 and the middle extremity B-1514, and a curved side B-1519 that joins the middle extremity B-1514 and the lower extremity B-1516 to curve around the front end B-1340 of the support beam B-1300.

The back end B-1360 of the support beam B-1300 is rotatably affixed to the back mount B-1200 via a back mount lower pivot B-1202, e.g., shafts, bearings, pins, shoulders, nuts and bolts, or the like, while the front end B-1340 of the support beam B-1300 is ended by a fork B-1310 rotatably affixed to the front mount B-1100 via a fork pivot B-1312, e.g., shafts, bearings, pins, shoulders, nuts and bolts, or the like, nested in the curved side B-1519 of the bell cranks B-1510s. The fork B-1310 can include a fork lower protrusion B-1314 pointing downwardly that rotatably connects the fork B-1310 to the adjuster B-1600 via a fork lower pivot B-1316, e.g., shafts, bearings, pins, shoulders, nuts and bolts, or the like, and a pair of front blades B-1318 that is placed on external sides of the front mount B-1100 and holds to the fork pivot B-1312.

The back end B-1460 of the linkage beam B-1400 is rotatably affixed to the back mount B-1200 via a back mount upper pivot B-1204, e.g., shafts, bearings, pins, shoulders, nuts and bolts, or the like, that is placed above the back mount lower pivot B-1202 of the back mount B-1200.

The triangular bracket B-1720 can include a pair of triangular plates B-1722 that envelops the support beam B-1300 and the linkage beam B-1400. Each triangular plate of the pair of triangular plates B-1722 can include a summit portion B-1722s, a base portion B-1722b, and an embossment B-1726 between the base portion B-1722b and the summit portion B-1722s.

The upper portion B-1722s can protrude above the linkage beam B-1400 and be rotatably affixed to the piston B-1734 of the assistance system B-1700 via a triangular pivot B-1724, e.g., shafts, bearings, pins, shoulders, nuts and bolts, or the like, that joins the upper portion B-1722s of each triangular plate B-1722. The base portion B-1722b is affixed to the support beam B-1300 via a plurality of fastening devices, e.g., threaded pins and shoulders, screws, bolts, and/or rivets. The embossment B-1726 can face the linkage beam B-1400 to provide spacing between the linkage beam B-1400 and the pair of triangular plates B-1720 and to enable the articulation of the pair of articulated arms B-1000 from the work position to the transport position, and vice-versa.

The adjuster B-1600 can include a front anchor B-1610 rotatably affixed to the lower extremity B-1516 of the bell cranks B-1510s via the bell crank lower pivot B-1517, a back anchor B-1630 affixed to the fork lower protrusion B-1314 of the fork B-1310 via the fork lower pivot B-1316, an adjustment rod B-1620 with a fix adjustment nut B-1622 that joins the front anchor B-1610 and the back anchor B-1630. The front anchor B-1610 can include a front anchor hole B-1612 to receive a front end of the adjustment rod B-1620 and the back anchor B-1630 can include a back anchor hole B-1632 to receive a back end of the adjustment rod B-1620. The front anchor hole B-1612 can have a first direction thread, e.g., a right-hand thread, the back anchor hole B-1632 can have a second direction thread opposite to the first direction thread, e.g., a left-hand thread, and the adjustment rod B-1620 can have the first direction thread or the second direction thread. In addition, a locking nut B-1624 can be inserted between the fix adjustment nut B-1622 and the front anchor B-1610 or the back anchor B-1630.

The adjuster B-1600 can calibrate the alignment of the caster axis $R_C$ by selecting an adjustment distance D between the front anchor B-1610 and the back anchor B-1630, shown in FIG. 3. In order to select the adjustment distance D, the adjustment rod B-1620 is rotated in the first direction thread or the second direction thread, via the fix adjustment nut B-1622, to move the front anchor B-1610 and the back anchor B-1630 closer or away from each so as to decrease or increase the adjustment distance D in order to tilt the caster axis $R_C$ towards the front or towards the back when the lift assist system 1000 is in the transport position. Once selected, the adjustment distance D can be locked in place by screwing the locking nut B-1624 against the front anchor B-1610 or the back anchor B-1630.

When the lift assist system 1000 is articulated from the work position to the transport position, the toolbar A-1000 is articulated from being substantially perpendicular with the vertical plane N to being tilted from the vertical plane N due to the articulation of the three-point hitch linkage E-1000 that rotates the toolbar A-1000 by the toolbar tilt angle $A_T$, see FIGS. 2B-2C.

The link B-1500 in combination with the adjuster B-1600 compensates the tilting of the toolbar A-1000 by linking the support beam B-1300 and the linkage beam B-1400 to maintain the caster pivot D-1200 and the caster axis $R_C$ substantially aligned with the vertical plane N, e.g., prevent the caster axis $R_C$ from exceeding a maximum tilting amplitude $A_m$ from the vertical plane N, see FIGS. 2B-2C.

More precisely, when the fork B-1310 of the support beam B-1300 rotates upwards, via the fork pivot B-1312, the fork lower protrusion B-1314 of the support beam B-1300 pulls on the front anchor B-1610 of the adjuster B-1600, the front anchor B-1610 of the adjuster B-1600 rotates the bell cranks B-1510s of the link B-1500 towards the rear, around the middle axis of rotation $R_m$, the bell cranks B-1510s of the link B-1500 pulls the linkage beam B-1400 towards the front, via the bell cranks high pivot B-1513, the linkage beam B-1400 pulls the back mount B-1200 and maintains the caster pivot D-1200 supported by the back mount B-1200 substantially aligned with the vertical plane N.

Alternatively, the lift assist system 1000 can rely simply on one gauge wheel connected to one or more articulated arms.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

What is claimed is:

1. A lift assist system to assist a tool operated by a tractor, comprising:
   a toolbar affixed to a lift mechanism of the tractor to support the tool;
   a wheel bar substantially parallel to the toolbar;
   a caster rotatably affixed to the wheel bar, via a swivel pivot that rotates around a pivot axis, to provide support and maneuverability on a ground surface; and
   a pair of articulated arms to be articulated, via an operation of the lift mechanism, from a work position wherein the tool is in contact with the ground surface to a transport position wherein the tool is not in contact with the ground surface and the toolbar is tilted with a vertical direction, each articulated arm of the pair of articulated arms including
      a first mount affixed to the toolbar,
      a second mount affixed to the wheel bar,
      a support beam having
         a first end rotatably affixed to the first mount, and
         a second end rotatably affixed to the second mount,
      a linkage beam having
         a first end connected to the first mount via links rotatably affixed to the first end of the linkage beam and pivotally affixed to the first mount, and
         a second end rotatably affixed to the second mount, and
      an adjuster that connects the first end of the support beam to the links, wherein
         the links compensates a tilting of the toolbar from the vertical direction and maintains the swivel pivots pivot axis substantially aligned with the vertical direction, and
         the adjuster maintains a selected distance between the first end of the support beam and the links to provide an adjustment of the pivot axis with the vertical direction.

2. The lift assist system of claim 1, wherein the links further comprise bell cranks having a first extremity rotatably affixed to the linkage beam, a second extremity rotatably affixed to the first mount, and a third extremity rotatably affixed to the adjuster.

3. The lift assist system of claim 2, wherein first extremity of the bell crank protrudes upwardly from the first mount, the second extremity is affixed to the first mount, the third extremity protrudes downwardly from the first mount.

4. The lift assist system of claim 3, wherein the bell cranks include a curved side between the second extremity and the third extremity side to go around a pivot that connects the first end of the support beam to the first mount.

5. The lift assist system of claim 2, wherein the adjuster further comprises an first anchor rotatably affixed to the third extremity of the bell cranks, and a second anchor rotatably affixed to the first end of the support beam.

6. The lift assist system of claim 5, wherein the adjuster further comprises an adjustment rod that can be screwed in the first anchor and the second anchor to maintain the selected distance between the first end of the support beam and the link.

7. The lift assist system of claim 6, wherein the first anchor has a first direction thread to receive a first threaded end of the adjustment rod and the second anchor has a second direction thread, opposite to the first thread direction, to receive a second threaded end of the adjustment rod.

8. The lift assist system of claim 5, wherein the first end of the support beam includes a fork rotatably affixed to the first mount.

9. The lift assist system of claim 8, wherein the fork includes a protrusion rotatably affixed to the second anchor.

10. A lift assist system to assist a tool operated by a tractor, comprising:
   a toolbar affixed to a lift mechanism of the tractor to support the tool;
   a wheel bar substantially parallel to the toolbar;
   a caster rotatably affixed to the wheel bar, via a swivel pivot that rotates around a pivot axis, to provide support and maneuverability on a ground surface; and
   a pair of articulated arms to be articulated, via an operation of the lift mechanism, from a work position wherein the tool is in contact with the ground surface to a transport position wherein the tool is not in contact with the ground surface and the toolbar is tilted with a vertical direction, each articulated arm of the pair of articulated arms including
      a first mount affixed to the toolbar,
      a second mount affixed to the wheel bar,
      a support beam having
         a first end rotatably affixed to the first mount, and
         a second end rotatably affixed to the second mount, a linkage beam having
a first end connected to the first mount via links rotatably affixed to the first end of the linkage beam and pivotally affixed to the first mount, and
a second end rotatably affixed to the second mount,
an assistance system having
a C-shaped anchor affixed to the first mount,
a triangular bracket affixed to the support beam, and
an actuator that connects the C-shaped anchor and the triangular bracket to generate a down bias force on the support beam, and
an adjuster that connects the first end of the support beam to the links, wherein
the links compensates tilting of the toolbar from the vertical direction and maintains the pivot axis substantially aligned with the vertical direction, and
the adjuster maintains a selected distance between the first end of the support beam and the link to provide an adjustment of the pivot axis with the vertical direction.

11. The lift assist system of claim 10, wherein the links further comprise bell cranks having a first extremity rotatably affixed to the linkage beam, a second extremity rotatably affixed to the first mount, and a third extremity rotatably affixed to the adjuster.

12. The lift assist system of claim 11, wherein first extremity of the bell crank protrudes upwardly from the first mount, the second extremity is affixed to the first mount, the third extremity protrudes downwardly from the first mount.

13. The lift assist system of claim 12, wherein the bell cranks include a curved side between the second extremity and the third extremity side to go around a pivot that connects the first end of the support beam to the first mount.

14. The lift assist system of claim 11, wherein the adjuster further comprises an first anchor rotatably affixed to the third extremity of the bell cranks, and a second anchor rotatably affixed to the first end of the support beam.

15. The lift assist system of claim 14, wherein the adjuster further comprises an adjustment rod that can be screwed in the first anchor and the second anchor to maintain the selected distance between the first end of the support beam and the link.

16. The lift assist system of claim 15, wherein the first anchor has a first direction thread to receive a first threaded end of the adjustment rod and the second anchor has a second direction thread, opposite to the first thread direction, to receive a second threaded end of the adjustment rod.

17. The lift assist system of claim 14, wherein the first end of the support beam includes a fork rotatably affixed to the first mount.

18. The lift assist system of claim 17, wherein the fork includes a protrusion rotatably affixed to the second anchor.

19. The lift assist system of claim 10, wherein the triangular bracket includes a pair of triangular plates with each triangular plate of the pair of triangular plates having a base affixed to the support beam and a summit affixed to the actuator.

20. The lift assist system of claim 19, wherein each triangular plate further includes an embossment to provide spacing between the linkage beam and the pair of triangular plates.

* * * * *